Sept. 3, 1968          F. FASSLE          3,399,828
CENTRIFUGE SOLIDS DISCHARGE RECEIVING COMPARTMENT
Filed Nov. 25, 1966
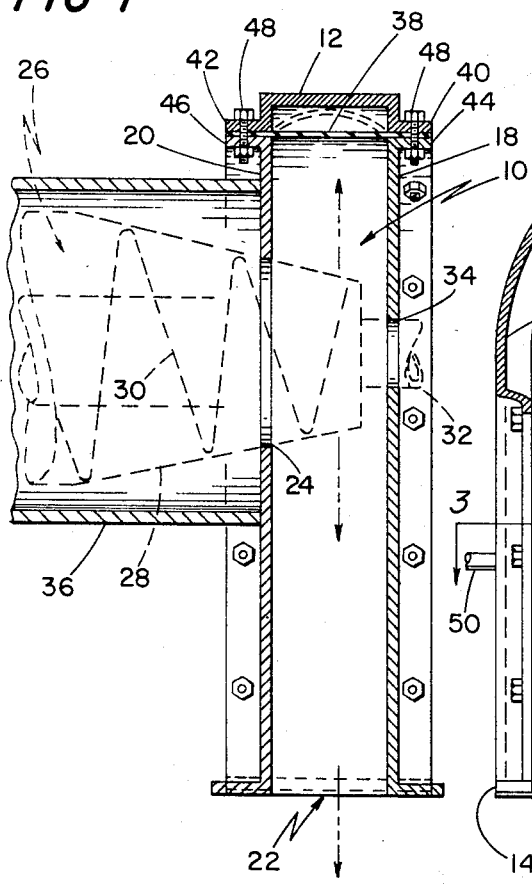
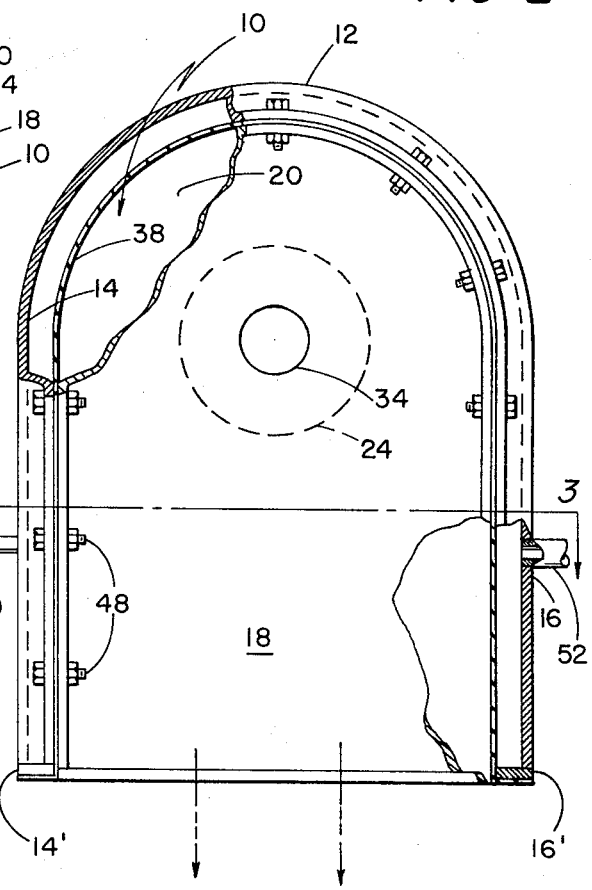
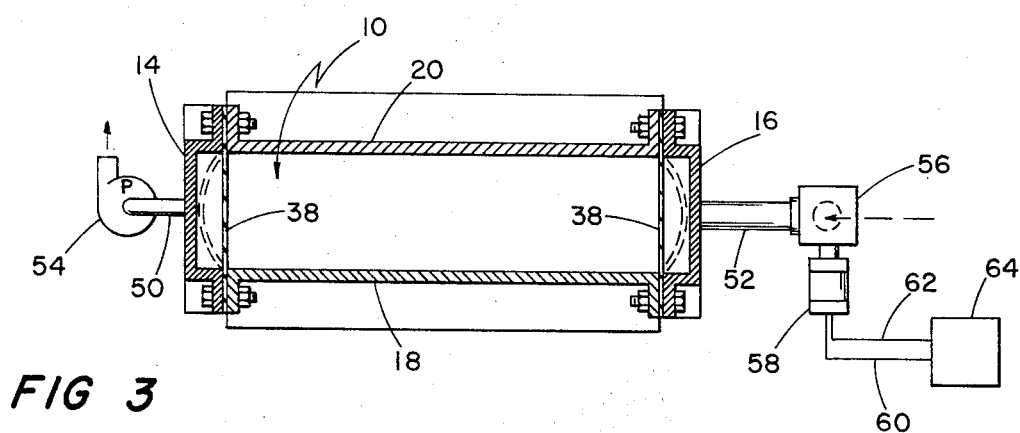

3,399,828
CENTRIFUGE SOLIDS DISCHARGE RECEIVING COMPARTMENT

Fritz Fassle, Limburgerhof, Pfalz, Germany, assignor to Bird Machine Company, South Walpole, Mass., a corporation of Massachusetts
Filed Nov. 25, 1966, Ser. No. 596,949
6 Claims. (Cl. 233—47)

ABSTRACT OF THE DISCLOSURE

The application discloses a compartment for initially receiving sticky solids discharged by a centrifuge. To prevent the solids from building up on wall areas against which they are thrown, such areas are provided in the form of an elastic membrane forming a wall of an hermetically sealed chamber. Means are provided for periodically suddenly changing the pressure in the chamber causing instantaneous flexing of the membrane. There are thus exerted on any caked solids on the membrane sudden jarring and shearing forces in directions both parallel and normal to the underlying membrane surface, causing the solids cake to crumble off. In the preferred embodiment shown, the sudden flexing of the membrane is toward the interior of the compartment providing strong ejecting force as in a sling shot, and is produced by first evacuating the chamber to expand the membrane inwardly thereof and quickly opening the relief chamber to atmosphere so that the membrane instantaneously retracts toward the interior of the compartment.

---

This invention relates to the solids discharge receiving compartment of a centrifuge and particularly to means for preventing substantial build-up of sticky solids on compartment wall areas against which they are thrown by the force of discharge.

Centrifuges for separating solids from liquid, particularly those of the continuous type such as the solid bowl continuous centrifuge, normally discharge the solids into a compartment which in turn discharges them to a chute or other conveyor. The solids are thrown by the force of discharge, which is usually directed mainly radially of the centrifuge axis, against interior wall surfaces of the compartment. Solids of a sticky nature tend to adhere to such surfaces as a cake which solidifies and builds up until the compartment is choked. This necessitates stopping the machine and cleaning the compartment, which is not only costly in machine downtime but also is frequently difficult where a hard, strongly adherent cake has formed. Moreover there is danger that the accumulation of cake in the compartment may become so extensive as to bind rotary parts of the centrifuge exposed in the compartment, thus greatly increasing the torque load on the machine with likelihood of machine breakdown.

The main object of this invention is to provide a solids receiving compartment for a centrifuge which is equipped with means for effectively preventing substantial accumulation of sticky solids cake on compartment wall areas against which the solids are thrown, thus overcoming the above-mentioned difficulties. Other objects are to provide such a compartment which is inexpensive to make and maintain and does not require operator supervision.

In obtaining these objectives the invention utilizes flexible membrane such as sheet rubber or rubber composition one face of which constitutes the inner wall surface areas of the compartment against which solids are thrown by the centrifuge discharge. The opposite surface of the membrane is exposed to the interior of an air-tight chamber to the side walls of which the membrane is sealed. Means are provided for periodically changing the pressure in the chamber suddenly to cause instantaneous substantial flexing of the membrane by the pressure differential providing jar and shear forces to dislodge any solids cake accumulated on the membrane, both in directions parallel to and normal to the membrane surface. The change in pressure may be either low to high or high to low, although low to high is preferred since this causes the membrane to flex in the direction of the interior of the chamber with strong cake ejecting forces in that direction. The sudden change is produced by a quick opening valve or valves to expose the chamber to the source of substantially higher or substantially lower pressure as the case may be.

The foregoing and other objects, features and advantages of the invention will be apparent from the ensuing description with particular reference to the preferred embodiment shown in the drawing, wherein:

FIG. 1 is a vertical longitudinal cross section view of a centrifuge solids discharge receiving compartment embodying the invention and of the portion of the centrifuge casing surrounding the solids discharge end of a centrifuge diagrammatically indicated by dotted lines;

FIG. 2 is a front elevation view, partly in vertical cross section, of the compartment shown in FIG. 2;

FIG. 3 is a transverse cross section view taken on line 3—3 of FIG. 1 looking in the direction of the arrows, also showing in top plan view operating connections.

Referring to FIGS. 1 and 2 of the drawing, the solids discharge receiving compartment designated generally 10 has an arcuate top outer wall 12, substantially straight vertical outer side walls 14, 16, vertically disposed front wall 18, and rear wall 20, secured together to form a generally rectangular interior compartment with an arcuate top and open at its base 22. These walls may be formed as usual of relatively rigid material such as iron, steel, aluminum or other metal. The solids received in the compartment are discharged through its open base to a suitable conveyor (not shown) such as a moving belt, a hopper or a chute. Rear wall 20 has an opening 24 through which extends the solids discharge end of a centrifuge 26.

Centrifuge 26 is diagrammatically indicated by dotted lines as of the solid bowl continuous type, having a bowl 28 and helical conveyor 30 which are supported and relatively rotated in the well-known manner by concentric drive shafts at each end of the bowl extending through support bearings to drive mechanism for one shaft at one end of the bowl and to interconnecting reduction gearing at the other end of the bowl, these not being indicated in the drawing except for a portion 32 of the drive shafts at the solids discharge end which extends through an opening 34 in front wall 18 of compartment 10. Solids are discharged from the end of the bowl shown in a direction generally radial to the centrifuge axis, as indicated by the dotted arrows in FIG. 1. Rear wall 20 of compartment 10 is attached to the end of the casing 36 of the centrifuge which surrounds its solids discharge end.

Top wall 12 and side walls 14, 16 are in the form of channels the sides of which extend inwardly and have secured to their inner ends and to flanges 40, 42 projecting laterally therefrom the side edges of a flexible sheet material or membrane 38. Membane 38 is elastic and substantially impervious to air, being preferably formed of rubber or rubber composition. Its edges are strongly bonded to the inner ends and flanges of the channel-form wall portions 12, 14 and 16 and also to plates 14', 16' closing the lower ends of the channels of wall portions 14, 16, by vulcanizing or cementing thereto to form said portions into a substantially air-tight chamber with the membrane forming its inner wall exposed to the interior of the compartment. The membrane is preferably secured under slight tension if any so that with no pressure differential at its opposite surfaces it assumes the position shown in full lines in the drawings. Flanges 40, 42 of members 12, 14 and 16 are fastened to corresponding flanges 44 on compartment front wall 18 and 46 on compartment rear wall 20, respectively, by bolts 48 passing through the flanges.

Means for providing sudden pressure changes in the chamber formed by wall portions 12, 14, 16 and membrane 38 are shown in FIG. 3 as comprising pipes 50, 52 opening through wall portions 14, 16 respectively. Pipe 50 is connected to a constant running suction or vacuum pump indicated at 54. Pipe 52 is connected to a valve 56 having a port (not shown) which may be alternately opened and closed to atmosphere. Valve 56 is of the fast acting or snap action type, controlled by solenoid 58 connected by circuit wires 60, 62 to a timing mechanism 64 which operates the solenoid intermittently at preset time intervals.

In use timer 64 causes valve 56 to close to start a cycle. The low pressure induced by pump 54 in the chamber closed by membrane 38 causes the membrane to expand inwardly as indicated by the dotted lines under the pressure differential on its opposite faces. At a predetermined time interval thereafter, valve solenoid 58 is actuated by timer 64 substantially instantaneously to open valve 56 and thereby the chamber to atmosphere. Pipe 52 and the port in valve 56 are large enough so that on opening of the valve port atmospheric pressure is restored substantially immediately in the chamber. The sudden change from low to atmospheric pressure in the chamber causes the membrane to contract suddenly to its full line position, and the cycle is thereupon repeated. The fast snap action of the contracting membrane produces strong shear forces generally parallel to its exposed surface as well as compressive forces on any solids cake accumulated thereon, thereby severing the bonds of accumulated solids cake to that surface and jarring, crumbling and breaking up the cake. At the same time sudden strong force is exerted on the cake in a direction substantially normal to the membrane surface toward the interior of the compartment, thus forcibly ejecting the dislodged and broken cake therefrom into the compartment with a slingshot-like action.

The time intervals between sudden changes from low to atmospheric pressure may be from 5 to 15 seconds or longer, depending on the nature of the solids and such factors as the rapidity of accumulation thereof on the membrane, the tenacity of their adherence thereto and whether the degree of such tenacity is a function of time. The extent of movement of the membrane between its full and dotted line positions is similarly variable. A distance of 1 to 2 inches between the dotted and full line positions of the central part of the membrane has been found highly effective, using a time cycle of 5 to 15 seconds. The capacity of the vacuum pump need be only such as to produce, within the time period between quick openings of the valve to atmosphere, a vacuum sufficient to expand the membrane into the chamber to the extent desired.

While it is preferred to produce the desired action of the membrane by sudden change from subatmospheric to atmospheric pressure as shown and just described, it will be apparent that a similar effect can be produced by suddenly changing the pressure in the chamber from atmospheric to superatmospheric pressure, thus causing the membrane to expand substantially instantaneously in the opposite direction from that shown in the drawings, toward the interior of the compartment. To effect this reverse action it is only necessary to substitute for vacuum pump 54 in FIG. 3 an adequate source of air under pressure, such as the tank of an air compressor, at a differential above atmospheric pressure comparable to the differential below atmospheric pressure used to actuate the membrane in the FIG. 3 arrangement, and to include a quick opening valve such as valve 56 in the pressure line to the chamber. With the valve 56 closed the pressure line valve is quickly opened to connect the chamber to the compressed air source, thereby substantially instantaneously producing superatmospheric pressure in the chamber to expand membrane 38 suddenly in the direction opposite to its expansion in the FIG. 3 arrangement and to like extent the cycle being completed by closing opening valve 56 to atmosphere, thereby restoring the chamber to atmospheric pressure and the membrane to retracted position. For such superatmospheric pressure operation, the space between the membrane in relaxed condition and the opposite chamber wall is reduced to minimize the amount of compressed air required.

As previously mentioned it is also possible to operate the membrane by sudden change from high to low pressure. Thus, again a source of compressed air is substituted for the vacuum pump of FIG. 3. This may be a constant running air compression pump contantly connected to the chamber. Valve 56 is kept closed to seal the chamber to the pressure system until the pressure therein rises sufficiently to distend the membrane oppositely to the direction of its extension in FIG. 3 and to like extent. Valve 56 is then quickly opened to exhaust the pressure substantially instantaneously to atmosphere, thereby producing sudden retraction of the membrane to its relaxed position. However, this method of operation is less desirable than fast change from low to high pressure because the direction of sudden contracting motion is away from the compartment and tends to force the cake against the membrane rather than to throw it off.

The membrane is shown applied only to the compartment walls parallel to the centrifuge axis as these are the walls, opposed to the direction of solids discharge from the centrifuge, on which the solids normally impinge and collect. If a problem is encountered of solids accumulation on the front or rear walls of the compartment, these, or the areas thereof affected, may be formed as membrane covered chambers connected to the pressure change system to operate in the same manner.

I claim:

1. Apparatus for preventing excessive accumulation of solids sticking on a wall area of a solids discharge compartment of a centrifuge, comprising a substantially airtight chamber forming member having as one of its walls an elastic membrane secured at its sides so that it is free to expand and retract therebetween under pressure differential exerted on its opposite surfaces, means mounting said member in said compartment so that said membrane forms said wall area, and means periodically to alter suddenly the pressure in said chamber to cause said membrane to change suddenly from one of said expanded and contracted conditions to the other, to dislodge solids accumulations thereon.

2. Apparatus according to claim 1 wherein said pressure altering means suddenly increases the pressure in said chamber.

3. Apparatus according to claim 1 wherein said pressure altering means changes the pressure in said chamber from sub-atmospheric to atmospheric.

4. Apparatus according to claim 1 wherein the change of pressure induced by said pressure altering means is such as to induce movement of said membrane in its central portions of at least one inch measured normal to its surface.

5. Apparatus according to claim 1 wherein said pressure alternations are produced by said pressure alternating means at predetermined time intervals of the order of 5 to 15 seconds' duration.

6. Apparatus according to claim 1 wherein said pressure altering means includes an air pump, a valve for connecting said chamber alternately to said pump and to atmosphere, and means for moving said valve substantially instantaneously from its position connecting said chamber to said pump to its position connecting said chamber to atmosphere.

References Cited

UNITED STATES PATENTS

| | | |
|---|---|---|
| 2,186,838 | 1/1940 | McGlaughlin. |
| 2,324,933 | 7/1943 | Jones. |
| 2,661,150 | 12/1953 | Abbott _____ 233—46 XR |
| 3,105,045 | 9/1963 | Borig _____ 233—22 |
| 3,326,458 | 6/1967 | Meryman et al. _____ 233—27 |

HENRY T. KLINKSIEK, *Primary Examiner.*